United States Patent
Huang et al.

(10) Patent No.: US 8,460,766 B2
(45) Date of Patent: Jun. 11, 2013

(54) LIQUID CRYSTAL COMPOUNDS AND COMPOSITIONS AND LIQUID CRYSTAL DISPLAYS AND PHOTOELECTRIC DEVICES COMPRISING THE COMPOUNDS AND COMPOSITIONS

(75) Inventors: Pei-Chen Huang, Taipei (TW);
Kuo-Chang Wang, Taichung (TW);
Kuo-Liang Yeh, Hsinchu (TW);
An-Cheng Chen, Hsinchu (TW);
Kung-Lung Cheng, Hsinchu (TW);
Shyue-Ming Jang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 75 days.

(21) Appl. No.: 13/157,657

(22) Filed: Jun. 10, 2011

(65) Prior Publication Data

US 2012/0164355 A1    Jun. 28, 2012

(30) Foreign Application Priority Data

Dec. 23, 2010    (TW) ................ 99145453 A

(51) Int. Cl.
| C09K 19/30 | (2006.01) |
| C09K 19/12 | (2006.01) |
| C09K 19/20 | (2006.01) |
| C07C 22/08 | (2006.01) |
| C07C 25/13 | (2006.01) |
| C07C 25/24 | (2006.01) |

(52) U.S. Cl.
USPC .......... 428/1.1; 252/299.63; 252/299.66; 252/299.67; 570/127; 570/128; 570/129; 570/130; 570/131

(58) Field of Classification Search
CPC ............ C09K 19/3066; C09K 2019/0466
USPC ............ 570/127, 128, 129, 130; 252/299.61, 252/299.63, 299.66, 299.67; 568/425, 642; 428/1.1
See application file for complete search history.

(56) References Cited

U.S. PATENT DOCUMENTS

| 4,345,249 | A |   | 8/1982  | Togashi |
| 5,232,625 | A |   | 8/1993  | Gray et al. |
| 5,271,864 | A |   | 12/1993 | Wand et al. |
| 5,409,744 | A |   | 4/1995  | Gotoh et al. |
| 5,458,806 | A | * | 10/1995 | Bartmann et al. ........ 252/299.63 |
| 5,698,134 | A |   | 12/1997 | Jubb et al. |
| 6,040,890 | A |   | 3/2000  | Sawada et al. |
| 6,284,154 | B1 |  | 9/2001  | Wächtler et al. |
| 7,335,405 | B2 |  | 2/2008  | Dubois et al. |
| 7,396,487 | B2 |  | 7/2008  | Kelly et al. |
| 7,648,743 | B2 |  | 1/2010  | Chen et al. |
| 2009/0123666 | A1 | | 5/2009 | Chen et al. |
| 2010/0009099 | A1 | | 1/2010 | Chen et al. |

FOREIGN PATENT DOCUMENTS

| CN | 101451065 | 6/2009 |
| EP | 1480079 | 11/2004 |
| JP | 2002311589 | 10/2002 |
| JP | 2003015298 | 1/2003 |
| JP | 2003057826 | 2/2003 |
| JP | 2004218656 | 8/2004 |
| TV | I297727 | 6/2008 |
| TW | I307357 | 3/2009 |
| TW | 200920819 | 5/2009 |
| TW | I320801 | 2/2010 |

OTHER PUBLICATIONS

An-Cheng Chen et al., "Novel LC Materials Toward the Faster Response Time and Lower Driving Voltage," IDW '07 2007, pp. 383-386.
Peer Kirsch et al., "Nematic Liquid Crystals for Active Matrix Displays: Molecular Design and Synthesis," Angew. Chem. Int. Ed. 2000, pp. 4216-4235.
Detlef Pauluth et al., "Advanced Liquid Crystals for Television," J. Mater. Chem., 2004, pp. 1219-1227.

* cited by examiner

*Primary Examiner* — Shean C Wu
(74) *Attorney, Agent, or Firm* — Muncy, Geissler, Olds & Lowe, PLLC

(57) ABSTRACT

A liquid crystal compound of Formula (1) is provided below:

wherein R is hydrogen, linear or branching C1-15 alkyl, linear or branching C1-15 alkyl (wherein any one of —$CH_2$— is replaced by —O—, —S—, —CO—, —CO—O—, or —O—CO—), linear or branching C2-15 alkenyl, or linear or branching C2-15 alkenyl (wherein any one of —$CH_2$— is replaced by —O—, —S—, —CO—, —CO—O—, or —O—CO—), A and B are, independently, cyclohexane, cyclohexane (wherein any one of —$CH_2$— is replaced by —O— or —NH—), benzene, or benzene (wherein any one of —$CH_2$= is replaced by —N=), X is a single bond, —CO—O—, —O—CO—, —$CH_2$O—, —O$CH_2$—, —$CH_2CH_2$—, —C=C—, —C≡C—, —$CF_2$O—, or —O$CF_2$—, Q is oxygen or $CH_2$, Y is $CF_3$, $CF_2H$, or $CFH_2$, $L_1$, $L_2$, and $L_3$ are, independently, hydrogen or fluorine, and m is 0, 1, or 2.

10 Claims, No Drawings

LIQUID CRYSTAL COMPOUNDS AND COMPOSITIONS AND LIQUID CRYSTAL DISPLAYS AND PHOTOELECTRIC DEVICES COMPRISING THE COMPOUNDS AND COMPOSITIONS

CROSS REFERENCE TO RELATED APPLICATIONS

This Application claims priority of Taiwan Patent Application No. 99145453, filed on Dec. 23, 2010, the entirety of which is incorporated by reference herein.

BACKGROUND

1. Field of the Invention

The invention relates to a liquid crystal compound, and more particularly to a liquid crystal compound and composition capable of reducing driving voltage and a liquid crystal display and photoelectric device comprising the compound and composition.

2. Description of the Related Art

The twisted nematic liquid crystal display (TN LCD) is especially suitable for flat panel display (FPD) applications. A TN LCD applied to a watch or a calculator only needs a tiny matrix fragment, for example, 8*8, but such conventional TN LCDs cannot be applied to the matrix fragment of thin film transistor (TFT) LCD, for example, a 1024*768. Although applications of TN LCDs have been enormously changed, however, its original advantages still have be maintained, such as light weight, small size and low power consumption. The structure and operation of the LCD driven by thin film transistors can be found in U.S. Pat. No. 4,345,249. The development of TFT LCDs with fast switching have gradually replaced the cathode ray tube (CRT) and in order to improve contrast, chromatism, power consumption and viewing angle of LCDs, other switch modes such as a vertical aligned (VA) mode or in-plane switch (IPS) mode, have also been gradually developed. Nowadays, CRTs have almost entirely been replaced by LCDs.

The liquid crystal formulation suitable for use in LCDs preferably forms a liquid crystal phase between −40° C. and 100° C. and the clearing point thereof is preferably, at least 10° C. higher than the operation temperature. The actuation of liquid crystal molecules in a display is that, under an electric field, the direction of the liquid crystal molecules with dielectric anisotropy will be altered to a new direction which is vertical to the original liquid crystal direction after a voltage is applied thereto. For example, after applying a driving voltage, under an electric field, the axis direction of the positive nematic liquid crystal molecules commonly utilized in the TN mode or IPS mode will be parallel to the direction of the electric field. Contrary to the positive nematic liquid crystal molecules, the axis direction of the negative nematic liquid crystal molecules commonly utilized in the VA mode will be vertical to the direction of the electric field. According to the formula, $Vth=\pi(K_{11}/\epsilon_0\Delta\epsilon)^{1/2}$, the driving voltage of LCDs is affected by the polarity or elastic constant of a liquid crystal molecules, wherein, the higher the polarity ($\Delta\epsilon$) or the less the splay elastic constant ($K_{11}$), the less the driving voltage. The liquid crystal formulation is formulated by liquid crystal monomers and the above-mentioned characteristics are all determined by the framework, substituent, molecular length and other construction characters of the liquid crystal molecules. The liquid crystal monomers with various weight percentages are formulated into appropriate liquid crystal formulations for an LCD.

SUMMARY

One embodiment of the invention provides a liquid crystal compound of Formula (1):

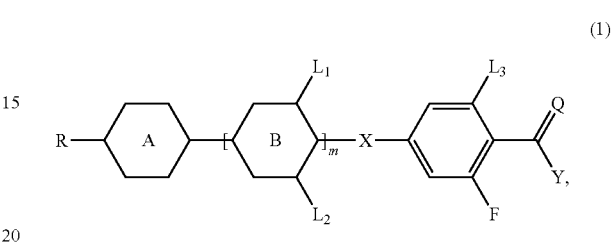

wherein:

R is hydrogen, linear or branching C1-15 alkyl, linear or branching C1-15 alkyl (wherein any one of —CH$_2$— is replaced by —O—, —S—, —CO—, —CO—O—, or —O—CO—), linear or branching C2-15 alkenyl, or linear or branching C2-15 alkenyl (wherein any one of —CH$_2$— is replaced by —O—, —S—, —CO—, —CO—O—, or —O—CO—); A and B are, independently, cyclohexane, cyclohexane (wherein any one of —CH$_2$— is replaced by —O— or —NH—), benzene, or benzene (wherein any one of —CH$_2$═ is replaced by —N═); X is a single bond, —CO—O—, —O—CO—, —CH$_2$O—, —OCH$_2$—, —CH$_2$CH$_2$—, —C≡C—, —CF$_2$O—, or —OCF$_2$—; Q is oxygen or CH$_2$; Y is CF$_3$, CF$_2$H, or CFH$_2$; L$_1$, L$_2$, and L$_3$ are, independently, hydrogen or fluorine; and m is 0, 1, or 2.

The present liquid crystal compound conducted with, for example, a trifluoromethyl ethylenyl group, to the terminal benzene ring thereof, minimizes the splay elastic constant ($K_{11}$), and conducted with, for example, fluorine atoms, to a side group thereof, maximizes dielectric anisotropy ($\Delta\epsilon$) and further effectively decreases driving voltage.

The present liquid crystal compound with, for example, a wide nematic liquid crystal phase temperature range, low viscosity, a low driving voltage and fast switching, is appropriate to be applied to transmissive, reflective and transflective LCDs and TN, IPS and VA drive modes, decreasing viscosity of a liquid crystal layer and effectively improving the functions of current LCDs.

One embodiment of the invention provides a liquid crystal display, comprising: an upper substrate; a lower substrate opposite to the upper substrate; and a liquid crystal layer comprising the disclosed liquid crystal compound of Formula (1) disposed between the upper substrate and the lower substrate.

One embodiment of the invention provides a photoelectric device, comprising: the disclosed liquid crystal display (with a liquid crystal layer comprising the disclosed liquid crystal compound of Formula (1)); and an electronic component connected with the liquid crystal display.

One embodiment of the invention provides a liquid crystal composition, comprising: a first liquid crystal compound of Formula (1):

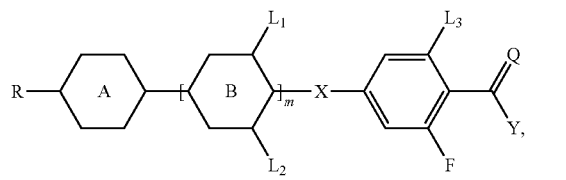

(1)

wherein

R is hydrogen, linear or branching C1-15 alkyl, linear or branching C1-15 alkyl (wherein any one of —CH$_2$— is replaced by —O—, —S—, —CO—, —CO—O—, or —O—CO—), linear or branching C2-15 alkenyl, or linear or branching C2-15 alkenyl (wherein any one of —CH$_2$— is replaced by —O—, —S—, —CO—, —CO—O—, or —O—CO—), A and B are, independently, cyclohexane, cyclohexane (wherein any one of —CH$_2$— is replaced by —O— or —NH—), benzene, or benzene (wherein any one of —CH$_2$═ is replaced by —N═), X is a single bond, —CO—O—, —O—CO—, —CH$_2$O—, —OCH$_2$—, —CH$_2$CH$_2$—, —C═C—, —C≡C—, —CF$_2$O—, or —OCF$_2$—, Q is oxygen or CH$_2$, Y is CF$_3$, CF$_2$H, or CFH$_2$, L$_1$, L$_2$, and L$_3$ are, independently, hydrogen or fluorine, and m is 0, 1, or 2; and a second liquid crystal compound of one of the Formulas (2)-(4):

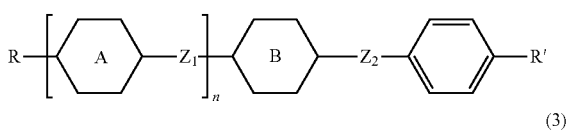

(2)

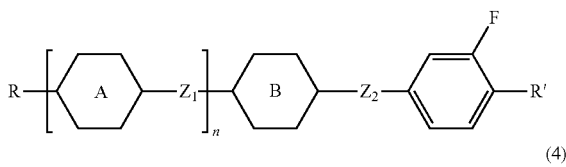

(3)

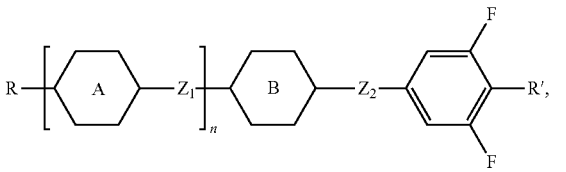

(4)

wherein

R is hydrogen, linear or branching C1-15 alkyl, linear or branching C1-15 alkyl (wherein any one of —CH$_2$— is replaced by —O—, —S—, —CO—, —CO—O—, or —O—CO—), linear or branching C2-15 alkenyl, or linear or branching C2-15 alkenyl (wherein any one of —CH$_2$— is replaced by —O—, —S—, —CO—, —CO—O—, or —O—CO—), A and B are, independently, cyclohexane, cyclohexane (wherein any one of —CH$_2$— is replaced by —O— or —NH—), cyclohexane (wherein any one of hydrogen is replaced by fluorine), benzene, benzene (wherein any one of —CH$_2$═ is replaced by —N═), or benzene (wherein any one of hydrogen is replaced by fluorine), Z$_1$ and Z$_2$ are, independently, a single bond, —CO—O—, —O—CO—, —CH$_2$O—, —OCH$_2$—, —CH$_2$CH$_2$—, —C═C—, —C≡C—, —CF$_2$O—, or —OCF$_2$—, R' is fluorine, chlorine, CF$_3$, OCF$_3$, hydrogen, linear or branching C1-15 alkyl, linear or branching C1-15 alkyl (wherein any one of —CH$_2$— is replaced by —O—, —S—, —CO—, —CO—O—, or —O—CO—), linear or branching C2-15 alkenyl, or linear or branching C2-15 alkenyl (wherein any one of —CH$_2$— is replaced by —O—, —S—, —CO—, —CO—O—, or —O—CO—), and n is 0, 1, or 2.

One embodiment of the invention provides a liquid crystal display, comprising: an upper substrate; a lower substrate opposite to the upper substrate; and a liquid crystal layer comprising the disclosed liquid crystal composition disposed between the upper substrate and the lower substrate.

One embodiment of the invention provides a photoelectric device, comprising: the disclosed liquid crystal display (with a liquid crystal layer comprising the disclosed liquid crystal composition); and an electronic component connected with the liquid crystal display.

A detailed description is given in the following embodiments.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention provides a liquid crystal compound of Formula (1).

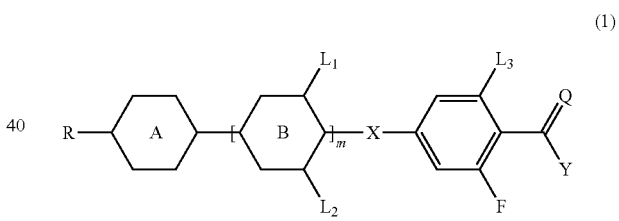

(1)

In Formula (1), R may be hydrogen, linear or branching C1-15 alkyl, linear or branching C1-15 alkyl (wherein any one of —CH$_2$— may be replaced by —O—, —S—, —CO—, —CO—O—, or —O—CO—), linear or branching C2-15 alkenyl, or linear or branching C2-15 alkenyl (wherein any one of —CH$_2$— may be replaced by —O—, —S—, —CO—, —CO—O—, or —O—CO—). R may be chiral.

A and B may be, independently, cyclohexane, cyclohexane (wherein any one of —CH$_2$— may be replaced by —O— or —NH—), benzene, or benzene (wherein any one of —CH$_2$═ may be replaced by —N═).

X may be a single bond, —CO—O—, —O—CO—, —CH$_2$O—, —OCH$_2$—, —CH$_2$CH$_2$—, —C═C—, —C≡C—, —CF$_2$O—, or —OCF$_2$—.

Q may be oxygen or CH$_2$.

Y may be CF$_3$, CF$_2$H, or CFH$_2$.

L$_1$, L$_2$, and L$_3$ may be, independently, hydrogen or fluorine.

m may be 0, 1, or 2.

Specific liquid crystal compounds of the invention are disclosed as follows.

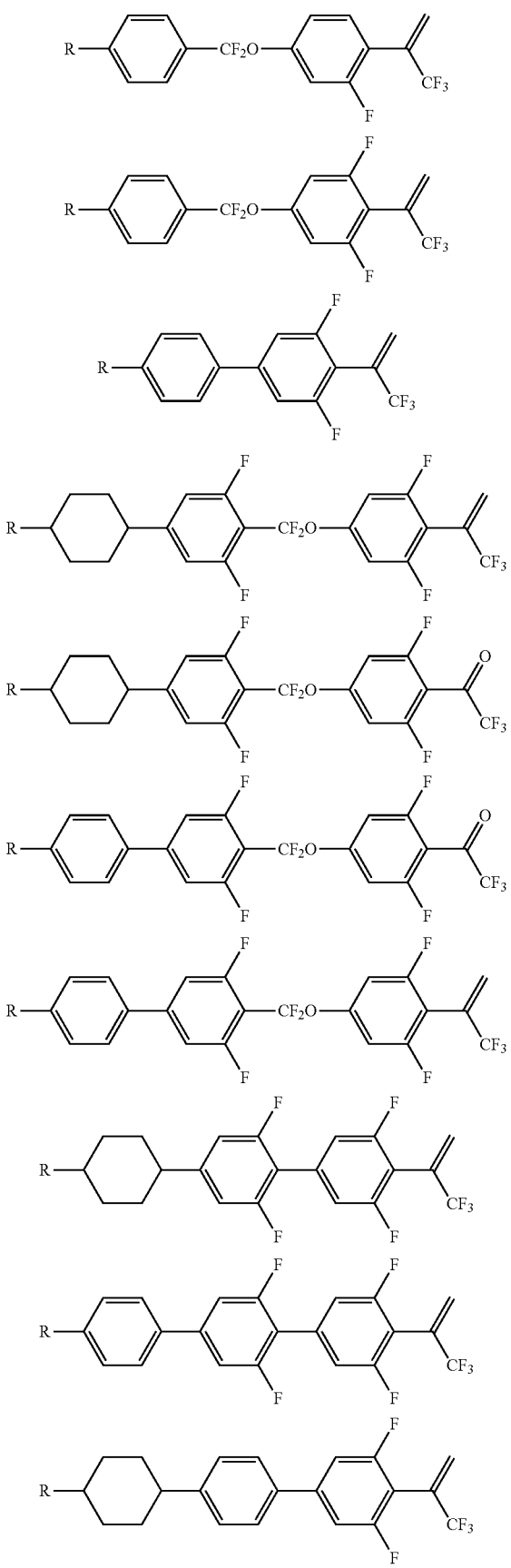

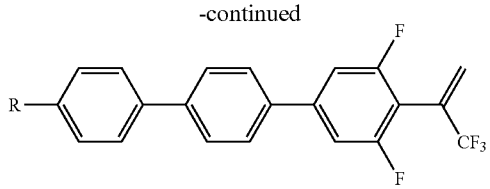

In the foregoing specific liquid crystal compounds, R may also be chiral.

The present liquid crystal compound conducted with, for example, a trifluoromethyl ethylenyl group, to the terminal benzene ring thereof, minimizes the splay elastic constant ($K_{11}$), and conducted with, for example, fluorine atoms, to a side group thereof, maximizes dielectric anisotropy ($\Delta\in$) and further effectively decreases driving voltage.

The present liquid crystal compound with, for example, a wide nematic liquid crystal phase temperature range, low viscosity, a low driving voltage and fast switching, is appropriate to be applied to transmissive, reflective and transflective LCDs and TN, IPS and VA drive modes, decreasing viscosity of a liquid crystal layer and effectively improving the functions of current LCDs.

One embodiment of the invention provides a liquid crystal display comprising an upper substrate, a lower substrate opposite to the upper substrate, and a liquid crystal layer comprising the disclosed liquid crystal compound of Formula (1) disposed between the upper substrate and the lower substrate.

In an embodiment, the upper and lower substrates may be a color filter substrate, an array substrate, an array on color filter substrate (AOC), a color filter on array substrate (COA) or a transparent substrate, for example, a glass substrate or a plastic substrate.

One embodiment of the invention provides a photoelectric device comprising the disclosed liquid crystal display (with a liquid crystal layer comprising the disclosed liquid crystal compound of Formula (1)), and an electronic component connected with the liquid crystal display.

The electronic component connected with the liquid crystal display may comprise control components, operating components, processing components, input components, memory components, drive components, light emitting components, protection components or a combination thereof.

The disclosed photoelectric device may comprise portable products (such as mobile phones, video cameras, cameras, notebook computers, game consoles, watches, music players, electronic mail transceivers, map navigation systems or similar products), audio-visual products (such as audio-visual players or similar products), screens, televisions, billboards or projectors.

One embodiment of the invention provides a liquid crystal composition comprising a first liquid crystal compound of Formula (1) and a second liquid crystal compound of one of the Formulas (2)-(4).

(1)

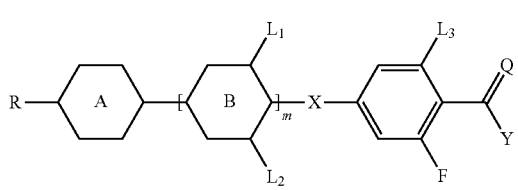

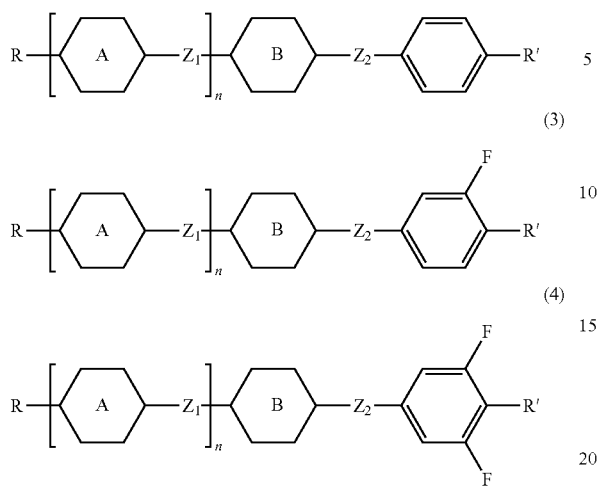

In Formula (1), R may be hydrogen, linear or branching C1-15 alkyl, linear or branching C1-15 alkyl (wherein any one of —CH$_2$— may be replaced by —O—, —S—, —CO—, —CO—O—, or —O—CO—), linear or branching C2-15 alkenyl, or linear or branching C2-15 alkenyl (wherein any one of —CH$_2$— may be replaced by —O—, —S—, —CO—, —CO—O—, or —O—CO—). R may be chiral.

A and B may be, independently, cyclohexane, cyclohexane (wherein any one of —CH$_2$— may be replaced by —O— or —NH—), benzene, or benzene (wherein any one of —CH$_2$= may be replaced by —N=).

X may be a single bond, —CO—O—, —O—CO—, —CH$_2$O—, —OCH$_2$—, —CH$_2$CH$_2$—, —C=C—, —C≡C—, —CF$_2$O—, or —OCF$_2$—.

Q may be oxygen or CH$_2$.

Y may be CF$_3$, CF$_2$H, or CFH$_2$.

L$_1$, L$_2$, and L$_3$ may be, independently, hydrogen or fluorine.

m may be 0, 1, or 2.

In Formulas (2)-(4), R may be hydrogen, linear or branching C1-15 alkyl, linear or branching C1-15 alkyl (wherein any one of —CH$_2$— may be replaced by —O—, —S—, —CO—, —CO—O—, or —O—CO—), linear or branching C2-15 alkenyl, or linear or branching C2-15 alkenyl (wherein any one of —CH$_2$— may be replaced by —O—, —S—, —CO—, —CO—O—, or —O—CO—). R may be chiral.

A and B may be, independently, cyclohexane, cyclohexane (wherein any one of —CH$_2$— may be replaced by —O— or —NH—), cyclohexane (wherein any one of hydrogen may be replaced by fluorine), benzene, benzene (wherein any one of —CH$_2$= may be replaced by —N=), or benzene (wherein any one of hydrogen may be replaced by fluorine).

Z$_1$ and Z$_2$ may be, independently, a single bond, —CO—O—, —O—CO—, —CH$_2$O—, —OCH$_2$—, —CH$_2$CH$_2$—, —C=C—, —C≡C—, —CF$_2$O—, or —OCF$_2$—.

R' may be fluorine, chlorine, CF$_3$, OCF$_3$, hydrogen, linear or branching C1-15 alkyl, linear or branching C1-15 alkyl (wherein any one of —CH$_2$— may be replaced by —O—, —S—, —CO—, —CO—O—, or —O—CO—), linear or branching C2-15 alkenyl, or linear or branching C2-15 alkenyl (wherein any one of —CH$_2$— may be replaced by —O—, —S—, —CO—, —CO—O—, or —O—CO—).

n may be 0, 1, or 2.

The foregoing specific second liquid crystal compounds are disclosed as follows, as shown in Formulas (5)-(17).

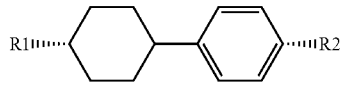

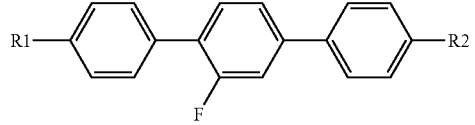

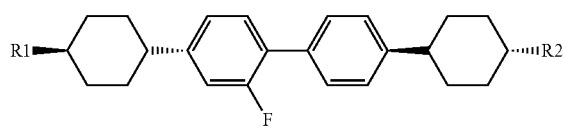

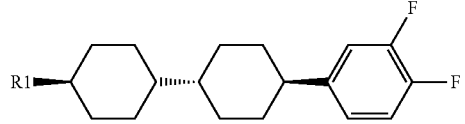

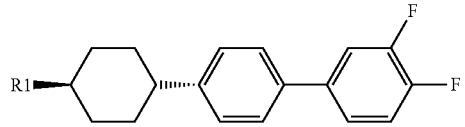

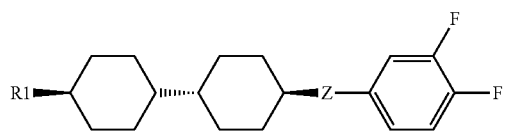

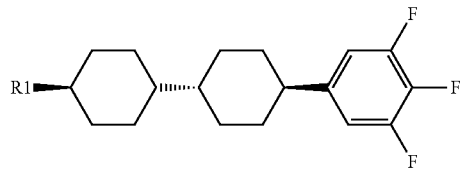

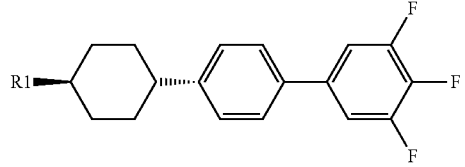

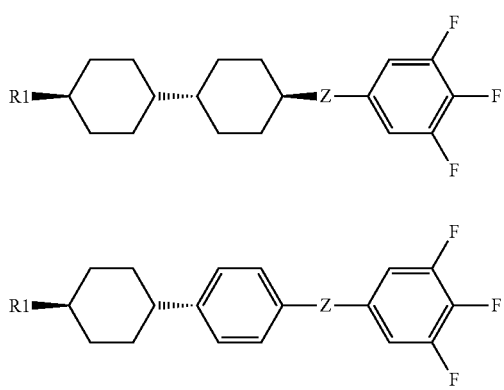

(16)

(17)

In the foregoing specific second liquid crystal compounds, R1 may also be chiral.

One embodiment of the invention provides a liquid crystal display comprising an upper substrate, a lower substrate opposite to the upper substrate, and a liquid crystal layer comprising the disclosed liquid crystal composition disposed between the upper substrate and the lower substrate.

In an embodiment, the upper and lower substrates may be a color filter substrate, an array substrate, an array on color filter substrate (AOC), a color filter on array substrate (COA) or a transparent substrate, for example, a glass substrate or a plastic substrate.

One embodiment of the invention provides a photoelectric device comprising the disclosed liquid crystal display (with a liquid crystal layer comprising the disclosed liquid crystal composition), and an electronic component connected with the liquid crystal display.

The electronic component connected with the liquid crystal display may comprise control components, operating components, processing components, input components, memory components, drive components, light emitting components, protection components or a combination thereof.

The disclosed photoelectric device may comprise portable products (such as mobile phones, video cameras, cameras, notebook computers, game consoles, watches, music players, electronic mail transceivers, map navigation systems or similar products), audio-visual products (such as audio-visual players or similar products), screens, televisions, billboards or projectors.

EXAMPLES

The raw material, solvent and silica gel utilized in column chromatography required by organic synthesis were purchased from various chemical suppliers, for example, Affa (Lancaster), TCI, Aldrich, Acros and Merck.

The synthesis methods are shown in following Examples. A series of compounds were synthesized in about 2-5 steps in accordance with common organic reactions.

Compound spectrums and electrical and physical properties of a liquid crystal formulation were measured by a BRUKER AVANCE DRX-400 NMR, LC Vision LCAS (I), autronic-MELCHERS GmbH DMS 803, Abbe refraction meter, TA Q10 DSC thermal differential scanning calorimeter, Olympus Mx40 polarizing microscope or other related machines.

Reference may be made to Table 1, concerning the corresponding structures of the codes of the liquid crystal compounds mentioned in the following Examples.

TABLE 1

| Codes | Formulas | |
|---|---|---|
| 3HBB(F)VTF | 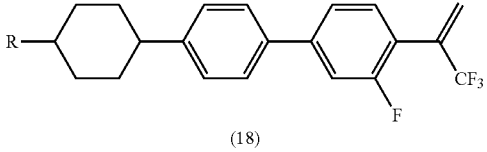 (18) | R = n-$C_3H_7$ |
| 5OBB(F)VTF | 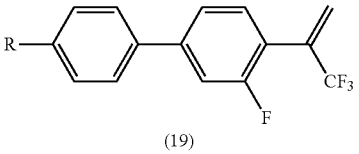 (19) | R = —$OC_5H_{11}$ |
| 3HBB(FF)VTF | 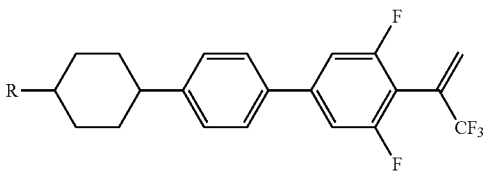 (20) | R = n-$C_3H_7$ |
| 3HB(FF)CF2O B(FF)KTF | 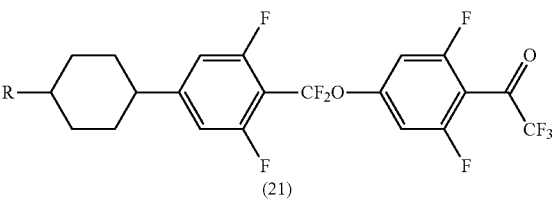 (21) | R = n-$C_3H_7$ |

TABLE 1-continued

| Codes | Formulas | |
|---|---|---|
| 3HB(FF)CF2O B(FF)VTF | (structure 22) | R = n-C$_3$H$_7$ |
| 5HBF | (structure) | R$_1$ = n-C$_5$H$_{11}$<br>R$_2$ = F |
| 3HBEB(FF)F<br>4HBEB(FF)F | (structure) | R$_1$ = n-C$_3$H$_7$<br>Z = COO<br>R$_1$ = n-C$_4$H$_9$<br>Z = COO |
| 3HHEB(FF)F | (structure) | R$_1$ = n-C$_3$H$_7$<br>Z = COO |
| 3HHB(FF)F<br>4HHB(FF)F<br>5HHB(FF)F | (structure) | R$_1$ = n-C$_3$H$_7$<br>R$_1$ = n-C$_4$H$_{11}$<br>R$_1$ = n-C$_5$H$_{11}$ |
| 3HBB(FF)F<br>5HBB(FF)F | (structure) | R$_1$ = n-C$_3$H$_7$<br>R$_1$ = n-C$_5$H$_{11}$ |
| 3HBB(F)F | (structure) | R$_1$ = n-C$_3$H$_7$ |
| 3HH2B(F)F | (structure) | R$_1$ = n-C$_3$H$_7$<br>Z = C$_2$H$_4$ |
| 3HHB(F)F | (structure) | R$_1$ = n-C$_3$H$_7$ |
| 3HHV | (structure) | R$_1$ = n-C$_3$H$_7$<br>R$_2$ = CH=CH$_2$ |

TABLE 1-continued

| Codes | Formulas | |
|---|---|---|
| 1BHHV |  | $R_1 = CH=CH_2$<br>$R_2 = CH_3$ |
| 2BB(F)B3 | 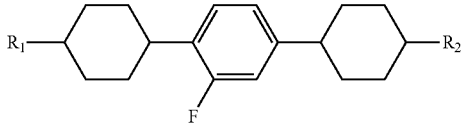 | $R_1 = C_2H_5$<br>$R_2 = n\text{-}C_3H_7$ |
| 5OBBVTF | 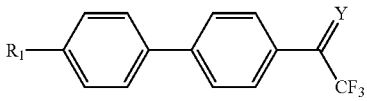 | $R_1 = OCH_2CH(CH_3)C_2H_5$<br>$Y = CH_2$ |
| 3HBB(F)VTF | 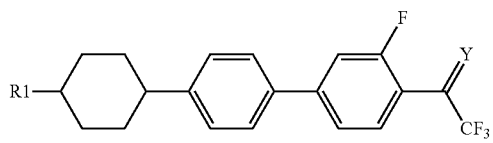 | $R_1 = n\text{-}C_3H_7$<br>$Y = CH_2$ |
| 3HBB(FF)VTF | 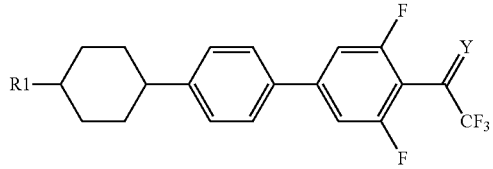 | $R_1 = n\text{-}C_3H_7$<br>$Y = CH_2$ |
| 3HB(FF)CF2O<br>B(F)KTF | 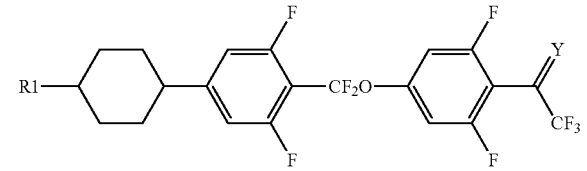 | $R_1 = n\text{-}C_3H_7$<br>$Y = O$ |
| 3HB(FF)CF2O<br>B(F)VTF | 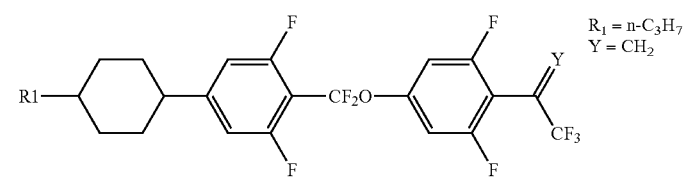 | $R_1 = n\text{-}C_3H_7$<br>$Y = CH_2$ |

The ratios mentioned in the following Examples are defined as "weight percentage".

Example 1

Synthesis of the Present Liquid Crystal Compounds (Formulas (18) and (19))

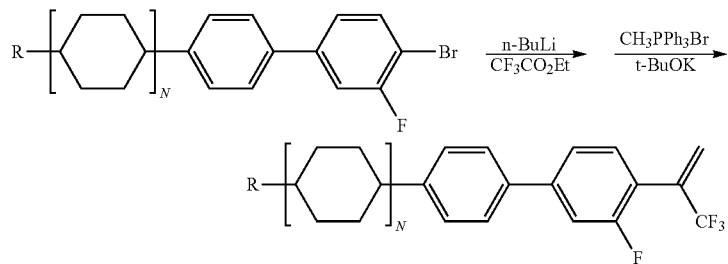

1. $N = 1; R = n\text{-}C_3H_7$
2. $N = 0; R = \text{—}OC_5H_{11}$

A commercial starting material was placed in a dried reaction flask. Dried THF as a solvent was added to the flask. N-butyl lithium was added to the flask under an ice bath with stirring. After 30 minutes, $CF_3CO_2Et$ was added to the flask dropwise to form a first solution. The first solution was reacted at a low temperature for 15 minutes and then reacted under room temperature for 4 hours. Saturated saline was added to the first solution to quench the reaction. The first solution was extracted with ether as a solvent to separate an organic phase. The organic phase was dried by adding dried magnesium sulfate. After removal of solvent, a crude product was obtained. The crude product was recrystallized by adding n-hexane thereto to form an intermediate. Methyltriphenylphosphonium bromide, dried THF and potassium t-butoxide were added to another reaction flask in order under an ice bath with stirring for 30 minutes. The previously formed intermediate was added to this flask to react for 1 hour to form a second solution. After removal of the ice bath, the second solution was reacted under room temperature for 2 hours. After the reaction was completed, the second solution was extracted with saturated saline and n-hexane to separate an organic phase. The organic phase was then dried. After removal of solvent, a crude product was obtained. After the crude product was purified by chromatography with a small quantity of silica gel using n-hexane as an elution, liquid crystal compounds (Formulas (18) and (19)) were obtained with a yield of about 40-50%.

Example 2

Synthesis of the Present Liquid Crystal Compound (Formula (20))

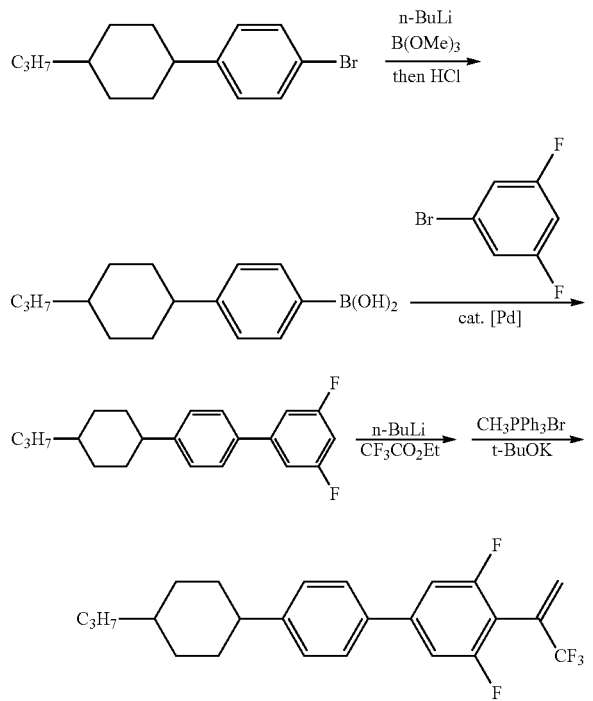

A commercial starting material was placed in a dried reaction flask. Dried THF as a solvent was added to the flask. N-butyl lithium was added to the flask under an ice bath with stirring. After 30 minutes, trimethyl borate was added to the flask and then reacted for 2 hours under room temperature with stirring to form a first solution. 6N hydrochloric acid was added to the first solution to quench the reaction. The first solution was continuously stirred for 4 hours under room temperature. The first solution was extracted with saturated saline and a large quantity of ether to separate an organic phase. After removal of solvent from the organic phase, a crude product was obtained. The crude product was recrystallized by adding ether/n-hexane to form a boric acid intermediate. The boric acid intermediate, bromide, sodium carbonate, tetrakis(triphenyl phosphine) palladium ($Pd(PPh_3)_4$), 1,2-dimethoxyethane (DME) and deionized water were added to a reaction flask in order for conduction with nitrogen gas and then reacted at 70° C. with stirring for 8 hours to form a resulting solution. The resulting solution was filtered by celite to remove the solid portion. The solution portion was then extracted with n-hexane and saturated saline to separate an organic phase. The organic phase was then dried. After removal of solvent, the organic phase was recrystallized by adding methanol thereto to form a pure intermediate, 3,5-difluoro-4-(4-propylcyclohexyl)biphenyl. The pure intermediate and dried THF as a solvent were added to a reaction flask. N-butyl lithium was added to the flask under an ice bath with stirring. After 30 minutes, $CF_3CO_2Et$ was added to the flask dropwise to form a second solution. The second solution was reacted at a low temperature for 15 minutes and then reacted under room temperature for 4 hours. Saturated saline was added to the second solution to quench the reaction. The second solution was extracted with ether as a solvent to separate an organic phase. The organic phase was dried by adding dried magnesium sulfate. After removal of solvent, a crude product was obtained. The crude product was recrystallized by adding n-hexane thereto to form an intermediate. Methyltriphenylphosphonium bromide, dried THF and potassium t-butoxide were added to another reaction flask in order under an ice bath with stirring for 30 minutes. The previously formed intermediate was added to this flask to react for 1 hour to form a third solution. After removal of the ice bath, the third solution was reacted under room temperature for 2 hours. After the reaction was completed, the third solution was extracted with saturated saline and n-hexane to separate an organic phase. The organic phase was then dried. After removal of solvent, a crude product was obtained. After the crude product was purified by chromatography with a small quantity of silica gel using n-hexane as an elution, a liquid crystal compound (Formula (20)) was obtained with a yield of about 15-20%.

Example 3

Synthesis of the Present Liquid Crystal Compound (Formula (21))

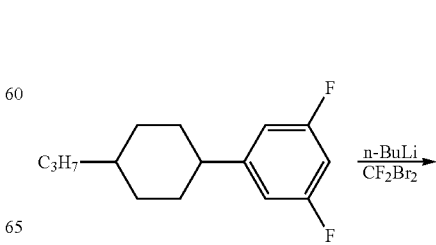

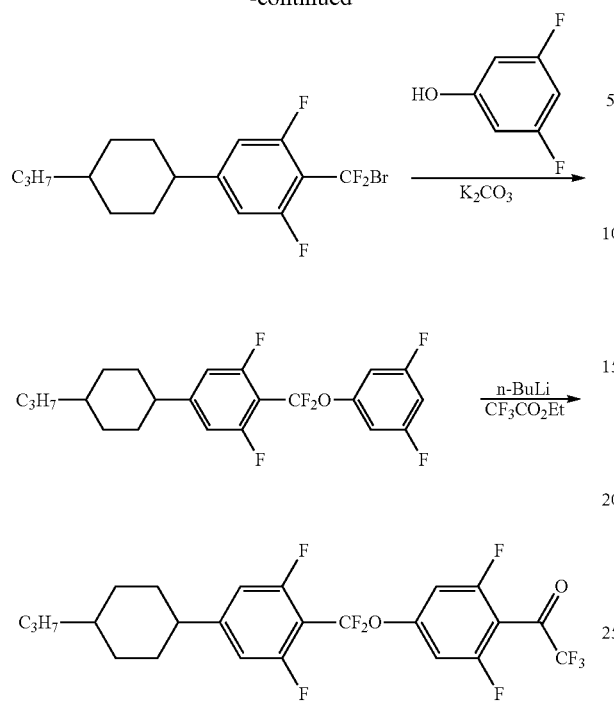

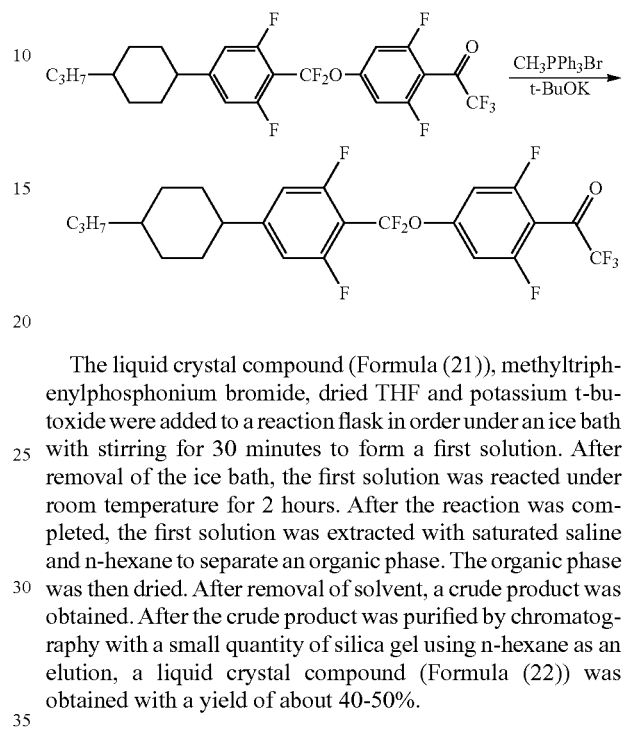

A commercial starting material was placed in a dried reaction flask. Dried THF as a solvent was added to the flask. N-butyl lithium was added to the flask under an ice bath. $CF_2Br_2$ was then added to the flask dropwise with stirring for 30 minutes and then reacted for 2 hours under room temperature to form a first solution. Saturated saline was added to the first solution to quench the reaction. The first solution was extracted with ether as a solvent to separate an organic phase. The organic phase was dried by adding dried magnesium sulfate. After removal of solvent, a crude product, 2-(bromodifluoromethyl)-1,3-difluoro-5-(4-propylcyclohexyl) benzene, was obtained. The crude product was recrystallized by adding n-hexane thereto to form an intermediate. The intermediate, the crude product, a proper quantity of DMF solvent, $K_2CO_3$ and commercial 3,5-difluoro phenol were added to another reaction flask and reacted with thermal reflux for 2 hours to form a resulting solution. Water was added to the resulting solution to quench the reaction. The resulting solution was extracted with ether to form a crude product. The crude product was recrystallized by adding methanol thereto to form an intermediate. The intermediate and dried THF as a solvent were added to a reaction flask. N-butyl lithium was added to the flask under an ice bath with stirring. After 30 minutes, $CF_3CO_2Et$ was added to the flask dropwise to form a second solution. The second solution was reacted at a low temperature for 15 minutes and then reacted under room temperature for 4 hours. Saturated saline was added to the second solution to quench the reaction. The second solution was extracted with ether as a solvent to separate an organic phase. The organic phase was dried by adding dried magnesium sulfate. After removal of solvent, a crude product was obtained. The crude product was purified by chromatography with a small quantity of silica gel using n-hexane as an elution, a liquid crystal compound (Formula (21)) was obtained with a yield of about 10-15%.

Example 4

Synthesis of the Present Liquid Crystal Compound (Formula (22))

The liquid crystal compound (Formula (21)), methyltriphenylphosphonium bromide, dried THF and potassium t-butoxide were added to a reaction flask in order under an ice bath with stirring for 30 minutes to form a first solution. After removal of the ice bath, the first solution was reacted under room temperature for 2 hours. After the reaction was completed, the first solution was extracted with saturated saline and n-hexane to separate an organic phase. The organic phase was then dried. After removal of solvent, a crude product was obtained. After the crude product was purified by chromatography with a small quantity of silica gel using n-hexane as an elution, a liquid crystal compound (Formula (22)) was obtained with a yield of about 40-50%.

Comparative Example 1

Preparation of Conventional Liquid Crystal Composition

Commercial liquid crystal compounds were formulated with various weight percentages to form a liquid crystal composition (formulation). For the liquid crystal composition, the structure codes and weight percentages of the liquid crystal compounds were as shown in Table 1a. The performance of the liquid crystal composition is shown in Table 1b.

TABLE 1a

| Codes | Content (%) |
|---|---|
| 5HBF | 7.5 |
| 3HBEB(FF)F | 2.5 |
| 4HBEB(FF)F | 2.0 |
| 3HHEB(FF)F | 6.2 |
| 3HHB(FF)F | 4.9 |
| 3HBB(FF)F | 9.6 |
| 5HBB(FF)F | 9.7 |
| 4HHB(FF)F | 5.2 |
| 5HHB(FF)F | 4.5 |
| 3HBB(F)F | 4.7 |
| 3HH2B(FF)F | 9.8 |
| 3HHB(F)F | 9.6 |
| 3HHV | 9.9 |
| 1BHHV | 9.1 |
| 2BB(F)B3 | 4.8 |

TABLE 1b

| | |
|---|---|
| Clearing point | 83.6 |
| Δε | 6.99 |
| Rotational viscosity | 17 |
| vth | 1.21 |

Example 5

Preparation of the Present Liquid Crystal Composition 1

The present liquid crystal compound with the structure code of 5OBB(F)VTF was added to the liquid crystal composition prepared from the Comparative Example 1 to form a liquid crystal composition. For the liquid crystal composition, the structure codes and weight percentages of the liquid crystal compounds were as shown in Table 2a. The performance of the liquid crystal composition is shown in Table 2b.

TABLE 2a

| Codes | Content (%) |
|---|---|
| 5HBF | 6.8 |
| 3HBEB(FF)F | 2.3 |
| 4HBEB(FF)F | 1.8 |
| 3HHEB(FF)F | 5.6 |
| 3HHB(FF)F | 4.4 |
| 3HBB(FF)F | 8.6 |
| 5HBB(FF)F | 8.7 |
| 4HHB(FF)F | 4.7 |
| 5HHB(FF)F | 4.1 |
| 3HBB(F)F | 4.2 |
| 3HH2B(FF)F | 8.8 |
| 3HHB(F)F | 8.6 |
| 3HHV | 8.9 |
| 1BHHV | 8.2 |
| 2BB(F)B3 | 4.3 |
| 5OBB(F)VTF | 10.0 |

TABLE 2b

| | |
|---|---|
| Clearing point | 68.2 |
| Δε | 6.5 |
| Rotational viscosity | 19 |
| vth | 1.2 |

Example 6

Preparation of the Present Liquid Crystal Composition 2

The present liquid crystal compound with the structure code of 3HBB(F)VTF was added to the liquid crystal composition prepared from the Comparative Example 1 to form a liquid crystal composition. For the liquid crystal composition, the structure codes and weight percentages of the liquid crystal compounds were as shown in Table 3a. The performance of the liquid crystal composition is shown in Table 3b.

TABLE 3a

| Codes | Content (%) |
|---|---|
| 5HBF | 6.8 |
| 3HBEB(FF)F | 2.3 |

TABLE 3a-continued

| Codes | Content (%) |
|---|---|
| 4HBEB(FF)F | 1.8 |
| 3HHEB(FF)F | 5.6 |
| 3HHB(FF)F | 4.4 |
| 3HBB(FF)F | 8.6 |
| 5HBB(FF)F | 8.7 |
| 4HHB(FF)F | 4.7 |
| 5HHB(FF)F | 4.1 |
| 3HBB(F)F | 4.2 |
| 3HH2B(FF)F | 8.8 |
| 3HHB(F)F | 8.6 |
| 3HHV | 8.9 |
| 1BHHV | 8.2 |
| 2BB(F)B3 | 4.3 |
| 3HBB(F)VTF | 10.0 |

TABLE 3b

| | |
|---|---|
| Clearing point | 82.7 |
| Δε | 6.74 |
| Rotational viscosity | 19 |
| vth | 1.14 |

Example 7

Preparation of the Present Liquid Crystal Composition 3

The present liquid crystal compound with the structure code of 3HBB(FF)VTF was added to the liquid crystal composition prepared from the Comparative Example 1 to form a liquid crystal composition. For the liquid crystal composition, the structure codes and weight percentages of the liquid crystal compounds were as shown in Table 4a. The performance of the liquid crystal composition is shown in Table 4b.

TABLE 4a

| Codes | Content (%) |
|---|---|
| 5HBF | 6.8 |
| 3HBEB(FF)F | 2.3 |
| 4HBEB(FF)F | 1.8 |
| 3HHEB(FF)F | 5.6 |
| 3HHB(FF)F | 4.4 |
| 3HBB(FF)F | 8.6 |
| 5HBB(FF)F | 8.7 |
| 4HHB(FF)F | 4.7 |
| 5HHB(FF)F | 4.1 |
| 3HBB(F)F | 4.2 |
| 3HH2B(FF)F | 8.8 |
| 3HHB(F)F | 8.6 |
| 3HHV | 8.9 |
| 1BHHV | 8.2 |
| 2BB(F)B3 | 4.3 |
| 3HBB(FF)VTF | 10.0 |

TABLE 4b

| | |
|---|---|
| Clearing point | 76.6 |
| Δε | 6.74 |
| Rotational viscosity | 20 |
| vth | 1.06 |

Example 8

Preparation of the Present Liquid Crystal Composition 4

The present liquid crystal compound (10%) with the structure code of 3HB(FF)CF2OB(FF)KTF was added to the liquid crystal composition prepared from the Comparative Example 1 to form a liquid crystal composition. For the liquid crystal composition, the structure codes and weight percentages of the liquid crystal compounds were as shown in Table 5a. The performance of the liquid crystal composition is shown in Table 5b.

TABLE 5a

| Codes | Content (%) |
| --- | --- |
| 5HBF | 6.8 |
| 3HBEB(FF)F | 2.3 |
| 4HBEB(FF)F | 1.8 |
| 3HHEB(FF)F | 5.6 |
| 3HHB(FF)F | 4.4 |
| 3HBB(FF)F | 8.6 |
| 5HBB(FF)F | 8.7 |
| 4HHB(FF)F | 4.7 |
| 5HHB(FF)F | 4.1 |
| 3HBB(F)F | 4.2 |
| 3HH2B(FF)F | 8.8 |
| 3HHB(F)F | 8.6 |
| 3HHV | 8.9 |
| 1BHHV | 8.2 |
| 2BB(F)B3 | 4.3 |
| 3HB(FF)CF2OB(FF)KTF | 10.0 |

TABLE 5b

| | |
| --- | --- |
| Clearing point | 72.0 |
| $\Delta\epsilon$ | 7.38 |
| Rotational viscosity | 20 |
| vth | 0.84 |

Example 9

Preparation of the Present Liquid Crystal Composition 5

The present liquid crystal compound (5%) with the structure code of 3HB(FF)CF2OB(FF)KTF was added to the liquid crystal composition prepared from the Comparative Example 1 to form a liquid crystal composition. For the liquid crystal composition, the structure codes and weight percentages of the liquid crystal compounds were as shown in Table 6a. The performance of the liquid crystal composition is shown in Table 6b.

TABLE 6a

| Codes | Content (%) |
| --- | --- |
| 5HBF | 6.8 |
| 3HBEB(FF)F | 2.3 |
| 4HBEB(FF)F | 1.8 |
| 3HHEB(FF)F | 5.6 |
| 3HHB(FF)F | 4.4 |
| 3HBB(FF)F | 8.6 |
| 5HBB(FF)F | 8.7 |
| 4HHB(FF)F | 4.7 |
| 5HHB(FF)F | 4.1 |
| 3HBB(F)F | 4.2 |
| 3HH2B(FF)F | 8.8 |
| 3HHB(F)F | 8.6 |
| 3HHV | 8.9 |
| 1BHHV | 8.2 |
| 2BB(F)B3 | 4.3 |
| 3HB(FF)CF2OB(FF)KTF | 5.0 |

TABLE 6b

| | |
| --- | --- |
| Clearing point | 78.2 |
| $\Delta\epsilon$ | 7.00 |
| Rotational viscosity | 19 |
| vth | 0.88 |

Example 10

Preparation of the Present Liquid Crystal Composition 6

The present liquid crystal compound (10%) with the structure code of 3HB(FF)CF2OB(FF)VTF was added to the liquid crystal composition prepared from the Comparative Example 1 to form a liquid crystal composition. For the liquid crystal composition, the structure codes and weight percentages of the liquid crystal compounds were as shown in Table 7a. The performance of the liquid crystal composition is shown in Table 7b.

TABLE 7a

| Codes | Content (%) |
| --- | --- |
| 5HBF | 6.8 |
| 3HBEB(FF)F | 2.3 |
| 4HBEB(FF)F | 1.8 |
| 3HHEB(FF)F | 5.6 |
| 3HHB(FF)F | 4.4 |
| 3HBB(FF)F | 8.6 |
| 5HBB(FF)F | 8.7 |
| 4HHB(FF)F | 4.7 |
| 5HHB(FF)F | 4.1 |
| 3HBB(F)F | 4.2 |
| 3HH2B(FF)F | 8.8 |
| 3HHB(F)F | 8.6 |
| 3HHV | 8.9 |
| 1BHHV | 8.2 |
| 2BB(F)B3 | 4.3 |
| 3HB(FF)CF2OB(FF)VTF | 10.0 |

TABLE 7b

| | |
| --- | --- |
| Clearing point | 71.1 |
| $\Delta\epsilon$ | 6.41 |
| Rotational viscosity | 20 |
| vth | 0.97 |

Example 11

Preparation of the Present Liquid Crystal Composition 7

The present liquid crystal compound (5%) with the structure code of 3HB(FF)CF2OB(FF)VTF was added to the liquid crystal composition prepared from the Comparative Example 1 to form a liquid crystal composition. For the liquid crystal composition, the structure codes and weight percentages of the liquid crystal compounds were as shown in Table 8a. The performance of the liquid crystal composition is shown in Table 8b.

TABLE 8a

| Codes | Content (%) |
|---|---|
| 5HBF | 6.8 |
| 3HBEB(FF)F | 2.3 |
| 4HBEB(FF)F | 1.8 |
| 3HHEB(FF)F | 5.6 |
| 3HHB(FF)F | 4.4 |
| 3HBB(FF)F | 8.6 |
| 5HBB(FF)F | 8.7 |
| 4HHB(FF)F | 4.7 |
| 5HHB(FF)F | 4.1 |
| 3HBB(F)F | 4.2 |
| 3HH2B(FF)F | 8.8 |
| 3HHB(F)F | 8.6 |
| 3HHV | 8.9 |
| 1BHHV | 8.2 |
| 2BB(F)B3 | 4.3 |
| 3HB(FF)CF2OB(FF)VTF | 5.0 |

TABLE 8b

| | |
|---|---|
| Clearing point | 77.4 |
| Δε | 6.48 |
| Rotational viscosity | 19 |
| vth | 1.02 |

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal compound of Formula (1):

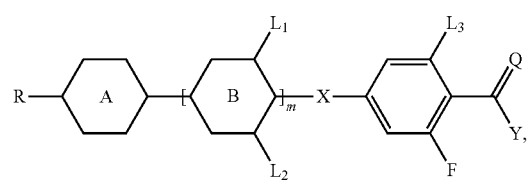

(1)

wherein
R is hydrogen, linear or branching C1-15 alkyl, linear or branching C1-15 alkyl (wherein any one of —CH$_2$— is replaced by —O—, —S—, —CO—, —CO—O—, or —O—CO—), linear or branching C2-15 alkenyl, or linear or branching C2-15 alkenyl (wherein any one of —CH$_2$— is replaced by —O—, —S—, —CO—, —CO—O—, or —O—CO—);
A and B are, independently, cyclohexane, cyclohexane (wherein any one of —CH$_2$— is replaced by —O— or —NH—), benzene, or benzene (wherein any one of —CH$_2$= is replaced by —N=);

when Q is CH$_2$, X is a single bond, —CO—O—, —O—CO—, —CH$_2$O—, —OCH$_2$—, —CH$_2$CH$_2$—, —C=C—, —C≡C—, —CF$_2$O— or —OCF$_2$—, when Q is oxygen, X is —CF$_2$O— or —OCF$_2$—;

Y is CF$_3$, CF$_2$H, or CFH$_2$;

L$_1$, L$_2$, and L$_3$ are, independently, hydrogen or fluorine; and m is 0, 1, or 2.

2. The liquid crystal compound as claimed in claim 1, wherein the liquid crystal compound comprises

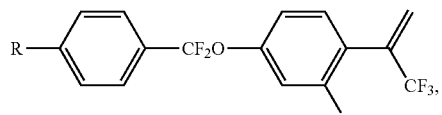

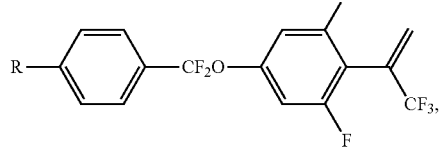

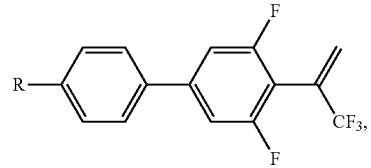

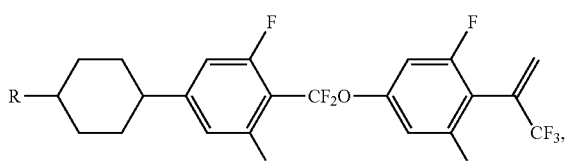

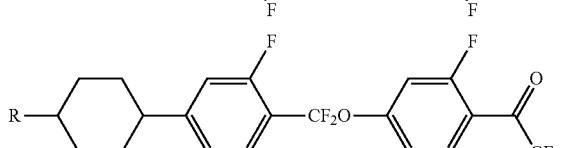

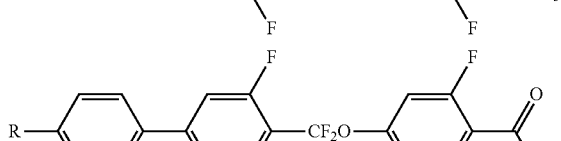

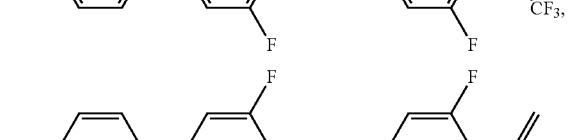

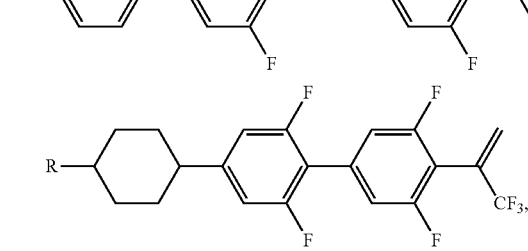

-continued

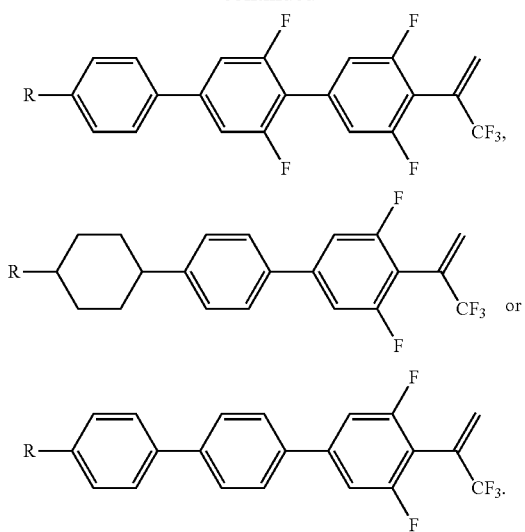

3. A liquid crystal composition, comprising:

a first liquid crystal compound of Formula (1):

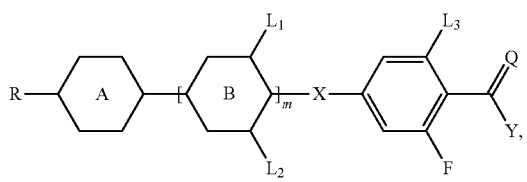

wherein

R is hydrogen, linear or branching C1-15 alkyl, linear or branching C1-15 alkyl (wherein any one of —CH₂— is replaced by —O—, —S—, —CO—, —CO—O—, or —O—CO—), linear or branching C2-15 alkenyl, or linear or branching C2-15 alkenyl (wherein any one of —CH₂— is replaced by —O—, —S—, —CO—, —CO—O—, or —O—CO—), A and B are, independently, cyclohexane, cyclohexane (wherein any one of —CH₂— is replaced by —O— or —NH—), benzene, or benzene (wherein any one of —CH₂═ is replaced by —N═), when Q is CH₂, X is a single bond, —CO—O—, —O—CO—, —CH₂O—, —OCH₂—, —CH₂CH₂—, —C≡C—, —CF₂O— or —OCF₂—, when Q is oxygen, X is —CF₂O— or —OCF₂—, Y is CF₃, CF₂H, or CFH₂, L₁, L₂, and L₃ are, independently, hydrogen or fluorine, and m is 0, 1, or 2; and a second liquid crystal compound of one of the Formulas (2)-(4):

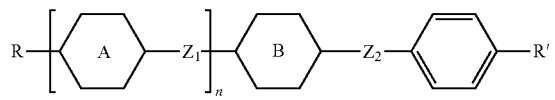

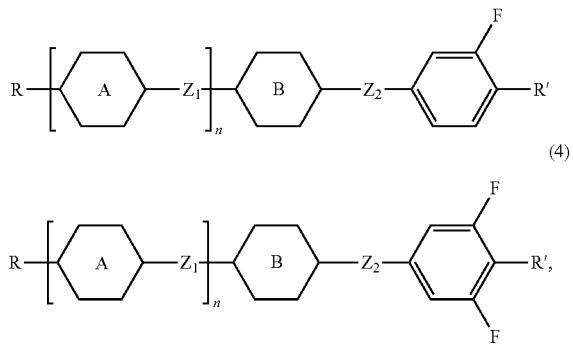

wherein

R is hydrogen, linear or branching C1-15 alkyl, linear or branching C1-15 alkyl (wherein any one of —CH₂— is replaced by —O—, —S—, —CO—, —CO—O—, or —O—CO—), linear or branching C2-15 alkenyl, or linear or branching C2-15 alkenyl (wherein any one of —CH₂— is replaced by —O—, —S—, —CO—, —CO—O—, or —O—CO—), A and B are, independently, cyclohexane, cyclohexane (wherein any one of —CH₂— is replaced by —O— or —NH—), cyclohexane (wherein any one of hydrogen is replaced by fluorine), benzene, benzene (wherein any one of —CH₂═ is replaced by —N═), or benzene (wherein any one of hydrogen is replaced by fluorine), Z₁ and Z₂ are, independently, a single bond, —CO—O—, —O—CO—, —CH₂O—, —OCH₂—, —CH₂CH₂—, —C═C—, —C≡C—, —CF₂O—, or —OCF₂—, R' is fluorine, chlorine, CF₃, OCF₃, hydrogen, linear or branching C1-15 alkyl, linear or branching C1-15 alkyl (wherein any one of —CH₂— is replaced by —O—, —S—, —CO—, —CO—O—, or —O—CO—), linear or branching C2-15 alkenyl, or linear or branching C2-15 alkenyl (wherein any one of —CH₂— is replaced by —O—, —S—, —CO—, —CO—O—, or —O—CO—), and n is 0, 1, or 2.

4. The liquid crystal composition as claimed in claim 3, wherein the second liquid crystal compound has one of Formulas (5)-(17):

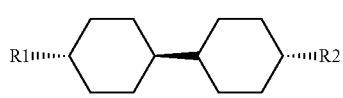

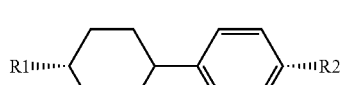

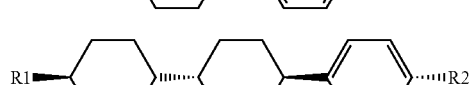

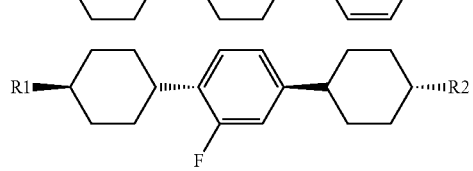

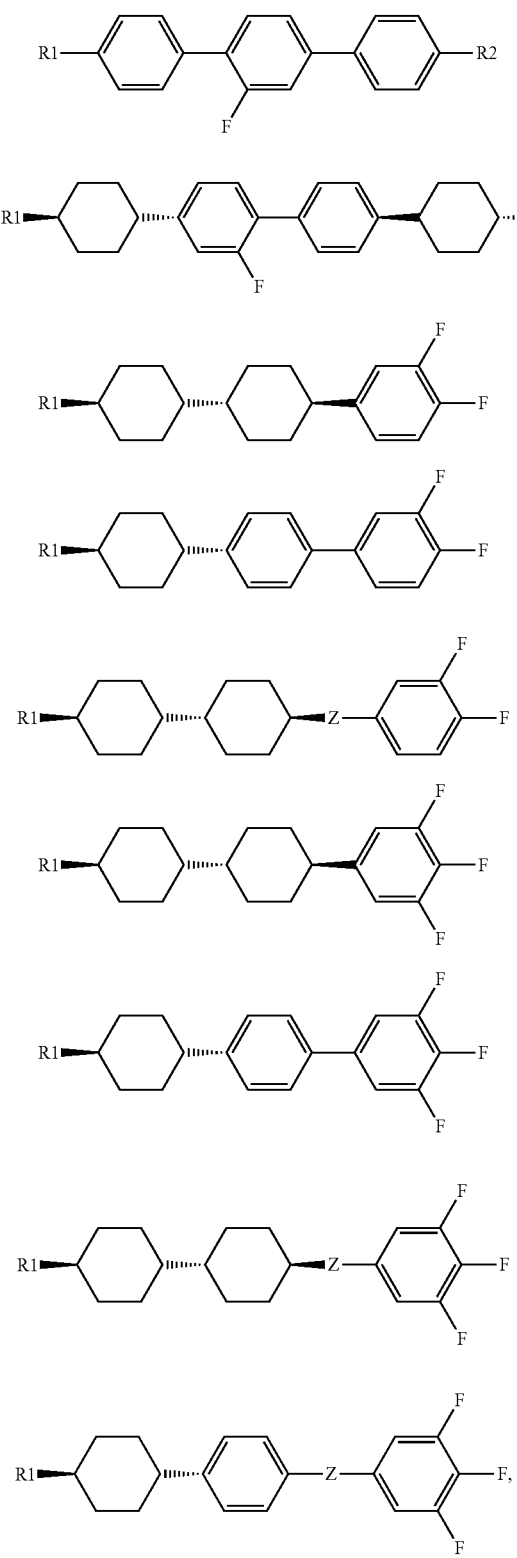

wherein
R1 is hydrogen, linear or branching C1-10 alkyl, linear or branching C1-10 alkyl (wherein any one of —CH₂— is replaced by —O—, —S—, —CO—, —CO—O—, or —O—CO—), linear or branching C2-10 alkenyl, or linear or branching C2-10 alkenyl (wherein any one of —CH₂— is replaced by —O—, —S—, —CO—, —CO—O—, or —O—CO—), Z is —CO—O—, —O—CO—, —CH₂O—, —OCH₂—, —CH₂CH₂—, —C=C—, —C≡C—, —CF₂O—, or —OCF₂—, and R2 is fluorine, hydrogen, linear or branching C1-10 alkyl, linear or branching C1-10 alkyl (wherein any one of —CH₂— is replaced by —O—, —S—, —CO—, —CO—O—, or —O—CO—), linear or branching C2-10 alkenyl, or linear or branching C2-10 alkenyl (wherein any one of —CH₂— is replaced by —O—, —S—, —CO—, —CO—O—, or —O—CO—).

5. A liquid crystal display, comprising:
an upper substrate;
a lower substrate opposite to the upper substrate; and
a liquid crystal layer comprising a liquid crystal compound as claimed in claim 1 disposed between the upper substrate and the lower substrate.

6. A liquid crystal display, comprising:
an upper substrate;
a lower substrate opposite to the upper substrate; and
a liquid crystal layer comprising a liquid crystal composition as claimed in claim 3 disposed between the upper substrate and the lower substrate.

7. A photoelectric device, comprising:
a liquid crystal display as claimed in claim 5; and
an electronic component connected with the liquid crystal display.

8. The photoelectric device as claimed in claim 7, wherein the electronic component comprises control components, operating components, processing components, input components, memory components, drive components, light emitting components, protection components or a combination thereof.

9. A photoelectric device, comprising:
a liquid crystal display as claimed in claim 6; and
an electronic component connected with the liquid crystal display.

10. The photoelectric device as claimed in claim 9, wherein the electronic component comprises control components, operating components, processing components, input components, memory components, drive components, light emitting components, protection components or a combination thereof.

* * * * *